(12) United States Patent
Liu et al.

(10) Patent No.: US 12,523,826 B2
(45) Date of Patent: Jan. 13, 2026

(54) PHOTONIC INTEGRATED CIRCUIT TO GLASS SUBSTRATE ALIGNMENT THROUGH INTEGRATED CYLINDRICAL LENS AND WAVEGUIDE STRUCTURE

(71) Applicant: Intel Corporation, Santa Clara, CA (US)

(72) Inventors: Changhua Liu, Chandler, AZ (US); Pooya Tadayon, Portland, OR (US); John Heck, Berkeley, CA (US); Eric J. Moret, Beaverton, OR (US); Tarek A. Ibrahim, Mesa, AZ (US); Zhichao Zhang, Chandler, AZ (US); Jeremy D Ecton, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 17/476,080

(22) Filed: Sep. 15, 2021

(65) Prior Publication Data

US 2023/0077633 A1    Mar. 16, 2023

(51) Int. Cl.
*G02B 6/42* (2006.01)

(52) U.S. Cl.
CPC ......... *G02B 6/4214* (2013.01); *G02B 6/4244* (2013.01)

(58) Field of Classification Search
CPC .............. G02B 6/4214; G02B 6/4244; G02B 2006/12102; G02B 2006/12104; G02B 2006/12147; G02B 6/122; G02B 6/136; G02B 6/12004
USPC ......................................................... 385/33
See application file for complete search history.

(56) References Cited

U.S. PATENT DOCUMENTS

| | | | |
|---|---|---|---|
| 6,075,913 A | 6/2000 | Cohen et al. | |
| 7,250,317 B2* | 7/2007 | Heideman | G02B 6/42 438/31 |
| 11,163,126 B2* | 11/2021 | Mack | G02B 6/4214 |
| 2003/0169979 A1* | 9/2003 | Fujita | G02B 6/4246 385/89 |
| 2005/0069253 A1* | 3/2005 | Heideman | G02B 6/42 385/31 |
| 2006/0239612 A1* | 10/2006 | De Dobbelaere | G02B 6/42 385/37 |
| 2011/0164227 A1* | 7/2011 | Kim | H04N 9/3114 353/98 |
| 2017/0207600 A1 | 7/2017 | Klamkin et al. | |

(Continued)

FOREIGN PATENT DOCUMENTS

| | | |
|---|---|---|
| CN | 115808750 | 3/2023 |
| GB | 2381769 | 5/2003 |

OTHER PUBLICATIONS

"European Application Serial No. 22185106.6, Extended European Search Report mailed Jan. 4, 2023", 8 pgs.

(Continued)

*Primary Examiner* — Jerry M Blevins
(74) *Attorney, Agent, or Firm* — Compass IP Law PC

(57) ABSTRACT

An electronic device comprises a photonic integrated circuit (PIC) including at least one waveguide, an emitting lens disposed on the PIC to emit light from the at least one waveguide in a direction substantially parallel to a first surface of the PIC, and an optical element disposed on the PIC and having a reflective surface configured to direct light emitted from the emitting lens in a direction away from the first surface of the PIC.

21 Claims, 4 Drawing Sheets

(56) References Cited

U.S. PATENT DOCUMENTS

| | | | |
|---|---|---|---|
| 2018/0348455 A1* | 12/2018 | Yasumura | G02B 6/12002 |
| 2019/0324211 A1 | 10/2019 | Israel et al. | |
| 2020/0278508 A1 | 9/2020 | Israel et al. | |
| 2020/0381887 A1* | 12/2020 | Watanabe | H01S 3/0621 |
| 2023/0077939 A1 | 3/2023 | Liu et al. | |
| 2023/0152537 A1* | 5/2023 | Witzens | G02B 6/4213 |
| | | | 385/33 |

OTHER PUBLICATIONS

First Office Action for U.S. Appl. No. 17/476,120, Mailed Feb. 12, 2025, 9 pages.

\* cited by examiner

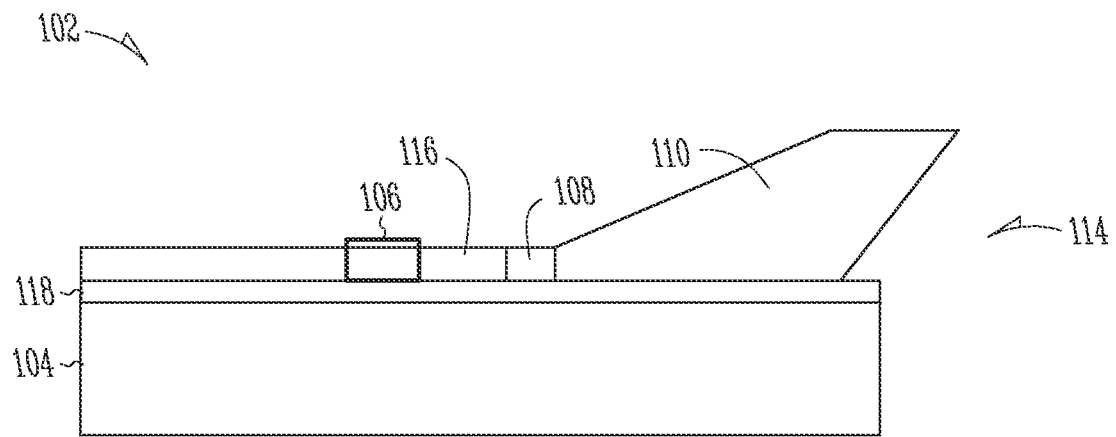
Fig.1
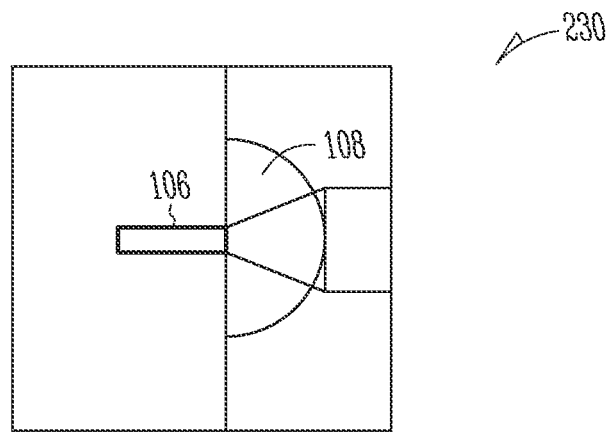
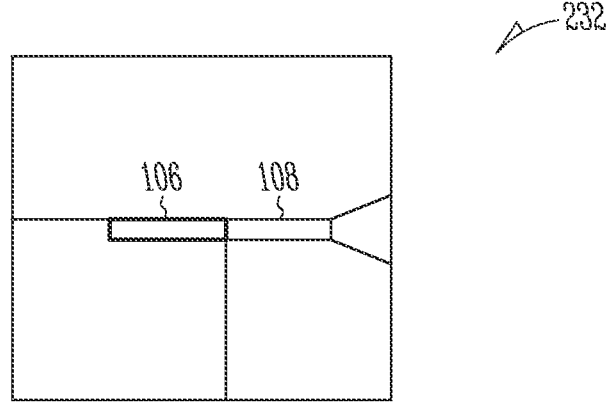
Fig.2

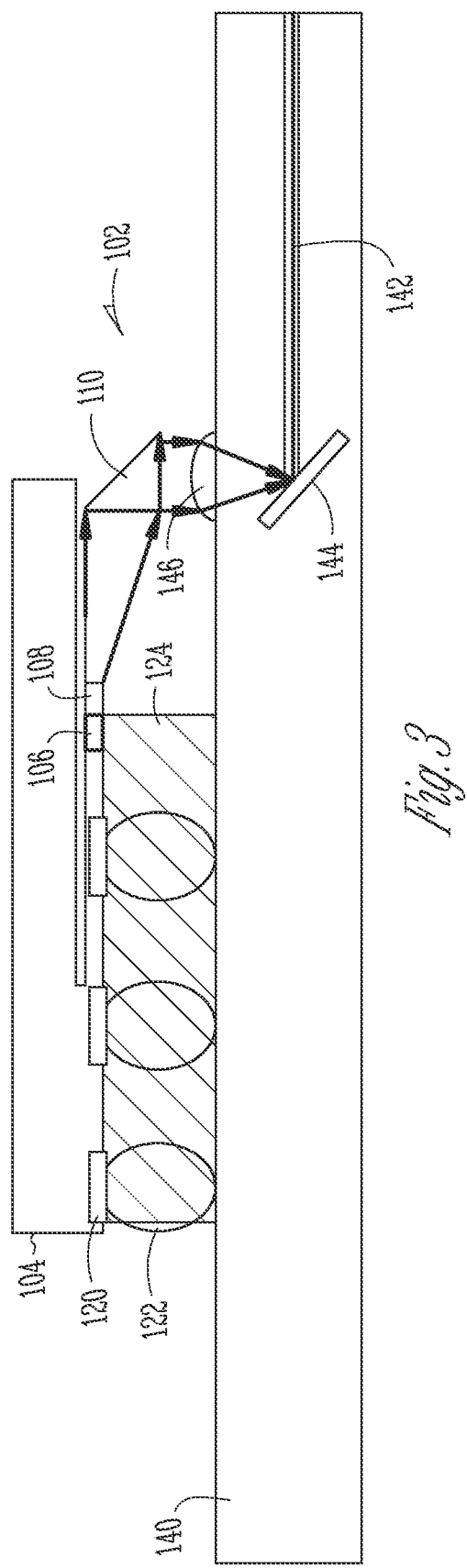
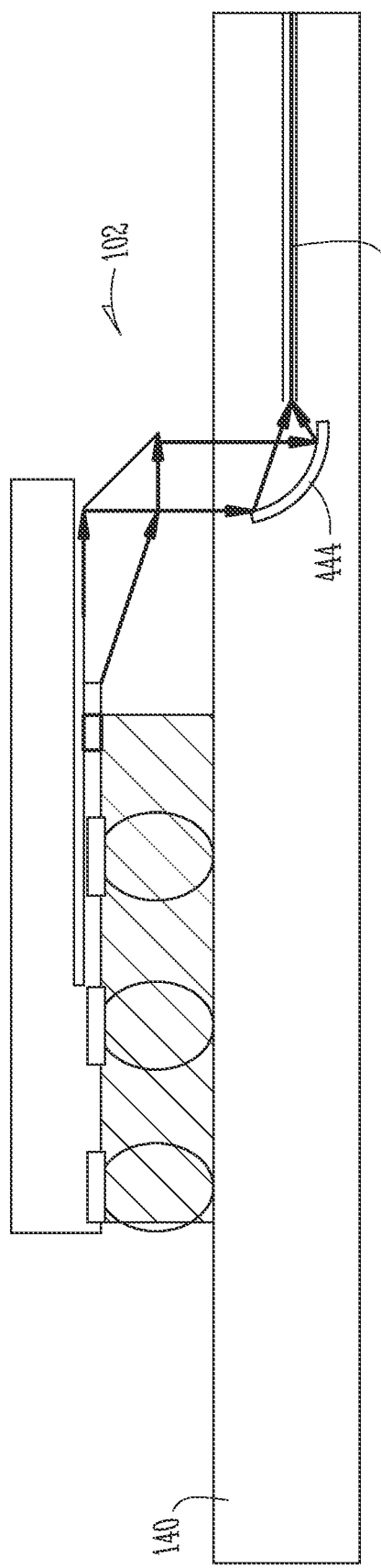

PHOTONIC INTEGRATED CIRCUIT TO GLASS SUBSTRATE ALIGNMENT THROUGH INTEGRATED CYLINDRICAL LENS AND WAVEGUIDE STRUCTURE

TECHNICAL FIELD

Embodiments pertain to photonic integrated circuits (PICs). Some embodiments relate to techniques to couple an optical signal from a PIC to a waveguide.

BACKGROUND

A photonic integrated circuit (PIC) can generate an optical signal. Optically coupling the optical signal to a waveguide allows the optical signal to be used in an optical interface that could be used as a high-speed interface between electronic devices. Waveguides could be fabricated in glass substrates, but there is not a well-established solution for optically coupling between the PIC and a glass substrate having a waveguide.

BRIEF DESCRIPTION OF THE DRAWINGS

FIG. 1 is an illustration of an example of an electronic device having a photonic integrated circuit (PIC) in accordance with some embodiments;

FIG. 2 is an illustration of an emitting lens of an electronic device in accordance with some embodiments;

FIG. 3 is illustration of an example of an electronic device mounted on a glass substrate in accordance with some embodiments;

FIG. 4 is illustration of another example of an electronic device mounted on a glass substrate in accordance with some embodiments;

DETAILED DESCRIPTION

Figure 5:
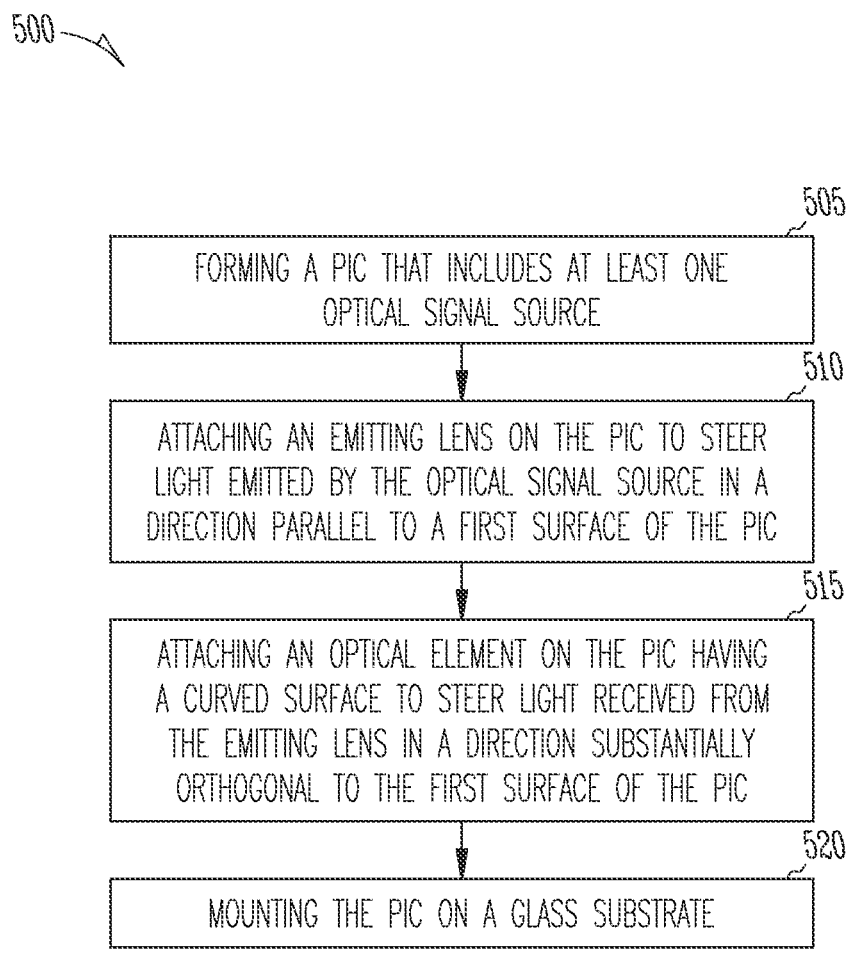
FIG. 5 is a flow diagram of a method of making an electronic device in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A glass substrate could potentially be used as a waveguide medium to carry optical signals in a photonic assembly or to integrate photonics into a conventional electronic assembly. However, using glass substrates for waveguides is not widely adopted, and currently there is no well-established solution for an optical coupling between a photonic integrated circuit (PIC) and a waveguide (e.g., a single mode waveguide) included in a glass substrate.

A spot size converter (SSC) can be used to expand the mode of the source of the PIC to match that the mode size of a single mode optical fiber (SMF) which is typically around 10 microns (10 um). The 10 um mode size means the alignment budget between the optical signal source and the SMF is less than 1 um. An alignment that is not within tolerance may result in signal loss. The mode size achievable through SSC is limited by the thickness of materials that can be deposited on the PIC.

If the mode size is expanded, the alignment budget would be relaxed. A relatively relaxed tolerance for alignment of the optical coupling between the PIC and the waveguide shouldn't be complicated, and ideally the alignment would be passive. This would reduce the complexity of assemblies that include photonic devices.

FIG. 1 is an illustration of an example of an electronic device 102 that includes a PIC 104. The PIC 104 includes at least one optical signal source 106 (e.g., a waveguide or a laser diode). In some examples, the PIC 104 includes an SSC 116. The electronic device 102 also includes an emitting lens 108 and another optical element 110. The emitting lens 108 is shown from the side in FIG. 1. In some examples the emitting lens 108 has an arc shape. In some examples, the emitting lens 108 has a half-cylinder shape orthogonal to the top surface of the PIC 104.

FIG. 2 are illustrations of the top view 230 and side view 232 of an optical signal source 106 and an example of an emitting lens 108. In the example of FIG. 2, the emitting lens is a half-cylinder lens. The emitting lens 108 may be fabricated with the PIC 104 using a using a lithography etching process. In certain examples, the emitting lens 108 may be added to the PIC 104 after the PIC 104 is fabricated. The emitting lens 108 may be made from a material that is transparent to light in the infrared (IR) spectrum. Because silicon is transparent to near infrared the optical element may include silicon, in certain examples the emitting lens 108 includes silicon (e.g., silicon nitride). The emitting lens 108 steers light emitted by the optical signal source 106 in a direction substantially parallel to the top surface of the PIC 104 (e.g., within a few degrees of parallel).

Returning to FIG. 1, the PIC 104 may include a buried insulator layer 118 (e.g., a buried oxide or BOX layer) at a height intermediate the top surface of the PIC 104 and the bottom surface of the PIC 104. The optical structures of the PIC 104 may be fabricated against the buried insulator layer 118. The emitting lens 108 may be arranged on the PIC 104 above the buried insulator layer 118.

The optical signals are expanded using the optical element 110 to a larger mode with minimum loss, which allows the alignment tolerance to be relaxed. For example, the optical element may expand the mode size from about 10 microns (10 μm) on the small side to 20-100 μm on the large side. The optical element 110 includes a reflective surface 114 to redirect the light beam received from the optical signal source 106. The optical element 110 may be made from glass or silicon. The reflective surface 114 may be a total internal reflection (TIR) surface. The optical element 110 steers the expanded light beam away from the PIC 104 vertically. The optical element 110 is also a collimating element and the expanded redirected light beam is a collimated light beam. The collimated light beam is sent in a direction orthogonal to the top surface of the PIC 104 to a glass substrate (not shown) that includes the waveguide (e.g., an SMF). At the glass substrate, the received light beam is reduced to the mode of the waveguide and steered onto the waveguide. Thus, the beam between the PIC 104 and the glass substrate is expanded and then reduced to allow the alignment between the PIC 104 and glass substrate to be relaxed.

FIG. 3 is illustration of an example of the electronic device 102 of FIG. 1 mounted on a glass substrate 140. The PIC 104 is shown flip-chip mounted on the glass substrate 140 with the optical element 110 facing the glass substrate. The PIC 104 has bonding pads 120 that are bonded to the glass substrate using solder bumps 122 (shown as solder balls). The height of the solder bumps may be greater than the height between the optical element 110 and the glass substrate 140 to provide clearance between the optical element 110 and the glass substrate 140. Because the electronic device 102 is inverted from FIG. 1, the collimated light beam is sent vertically down toward the glass substrate 140.

The assembly may include an underfill layer 124 between the flipped surface of the PIC and the top surface of the glass substrate 140. The underfill layer 124 may be transparent. The underfill layer 124 may serve as a cladding material, and the underfill material may a refractive index less than the refractive index of the material included in the optical element 110. An anti-reflective coating can be applied at the interface between the optical element 110 and the glass substrate 140.

The glass substrate 140 includes a waveguide 142 and another optical element to steer or focus the light received from the electronic device 102 onto the waveguide 142. The waveguide 142 may then transmit the optical signals in a direction parallel to the top surface of the glass substrate 140 to another device. The electronic device 102 and the glass substrate 140 form an interface to optically connect the optical signal source 106 and the waveguide 142. The optical element of the glass substrate can be a beam reduction structure to reduce the mode of the received light beam to the mode size of the waveguide. In the example of FIG. 3, the optical element of the glass substrate 140 includes lens 146 to reduce the beam and a mirror 144 to steer the beam into the waveguide 142. In certain examples, the lens 146 is a gradient index (GRIN) lens.

FIG. 4 is illustration of another example of the electronic device 102 of FIG. 1 mounted on a glass substrate 140. The difference from the example of FIG. 3 is in the optical element included in the glass substrate 140. In FIG. 4, the glass substrate 140 includes a curved mirror 444 to catch the collimated beam from the electronic device 102 and focus the beam onto the waveguide 142. The mirrors 144, 444 in FIGS. 3 and 4 may be formed by etching a cavity or surface in the glass substrate 140 and forming a reflective surface on the etched structure.

In the examples of FIGS. 3 and 4, one optical signal source 106 and waveguide 142 pair may be an optical channel that sends optical signals. The PIC 104 may include multiple optical signal sources 106 (e.g., multiple waveguides), multiple emitting lenses 108, and multiple optical elements 110—one emitting lens and one optical element 110 for each optical signal source 106. The glass substrate includes multiple waveguides 142. Each optical signal source and waveguide pair form an optical channel of an optical interface. The optical interface therefore includes multiple channels (e.g., 2 channels, 4 channels, 8 channels, etc.).

The glass substrate 140 includes additional optical elements for each optical channel to steer a corresponding collimated light beam onto the respective waveguide. For instance, the glass substrate 140 may include a lens 146 and mirror 144 as shown in FIG. 3 for each waveguide 142, or the glass substrate 140 may include a curved mirror 444 as shown in FIG. 4 for each waveguide.

FIG. 5 is a flow diagram of a method 500 of manufacture of an electronic device. The electronic device may be any of the electronic devices of shown in FIGS. 1, 3, and 4. At block 505, a PIC is formed that includes at least one optical signal source (e.g., a waveguide). The optical signal source may produce light in the infrared spectrum. The PIC may include a substrate portion and an active portion that includes one or both of active photonic circuit and active electronic circuits. The method may include forming a buried insulating layer (e.g., a BOX layer) and the active portion may be formed against (e.g., above) the buried insulator layer.

At block 510, an emitting lens is arranged on the PIC. The emitting lens may be arranged on a buried insulating layer of the PIC. The emitting lens may include silicon (e.g., silicon nitride) and may be etched onto the PIC (e.g., using a lithography etching process) during forming of the PIC. In certain examples, the emitting lens may be separate from the PIC and attached to the PIC (e.g., using glue or fused onto the PIC). The emitting lens is positioned to steer light emitted by the optical signal source in a direction substantially parallel to the top surface and the second surface of the PIC, and to expand the mode of the optical signal to relax the alignment tolerance of the PIC.

At block 515, an optical element is attached to the PIC. The optical element has a reflective surface as shown in the example of FIG. 1. The reflective surface steers light received from the emitting lens in a direction substantially orthogonal to the top surface of the PIC. Attaching the optical element may include, among other things, gluing the optical element 110 to the PIC 104 or fusing the optical element 110 to the PIC 104.

At block 520, the PIC with the attached optical element is mounted on a glass substrate. The PIC may include pads (e.g., bonding pads or I/O pads) on the top surface and mounting the PIC may include disposing solder bumps on the bonding pads and attaching the first surface of the PIC to a glass substrate using the solder bumps. The glass substrate includes a waveguide and another optical element to steer light onto the waveguide. The optical element of the PIC is positioned to provide a collimated light beam to the optical element of the glass substrate to steer an optical signal with a reduced mode onto the waveguide. Some examples of the optical element of the glass substrate include the lens 146 and mirror 144 in the example of FIG. 3, and the curved mirror 444 shown in the example of FIG. 4. As described regarding FIG. 5, the PIC and glass substrate may include multiple optical signal sources and waveguides included in multiple optical channels.

The electronic device and the glass substrate may be included in an optical interface between two or more higher level devices. Because the light from the optical signal source is expanded and then refocused, the tolerance needed in the alignment of the PIC to the waveguide is relaxed, and the aligning and assembly process of the PIC and the waveguide is simplified. An example of a higher level electronic device using assemblies with optical elements as described in the present disclosure is included to show an example of a higher level device application.

Figure 6:
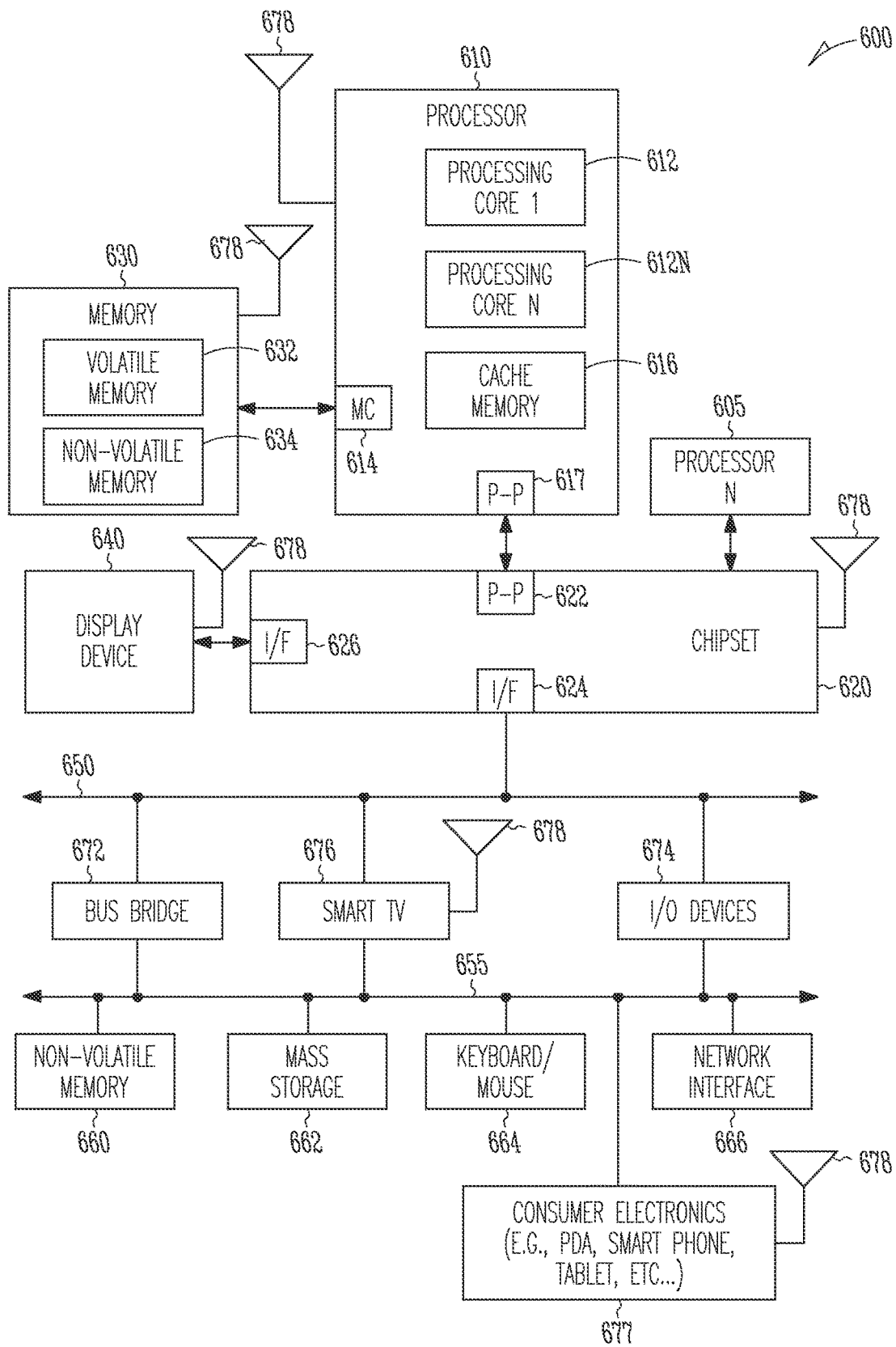
FIG. 6 illustrates a system level diagram in accordance with some embodiments.

FIG. 6 illustrates a system level diagram, according to one embodiment of the invention. For instance, FIG. 6 depicts an example of an electronic device (e.g., system) that can include one or more of stiffening interposers (e.g., glass interposers) as described in the present disclosure. In one embodiment, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 is a system on a chip (SOC) system. In one example, two or more systems as shown in FIG. 6 may be coupled together using one or more glass interposers as described in the present disclosure.

In one embodiment, processor 610 has one or more processing cores 612 and 612N, where N is a positive integer and 612N represents the Nth processor core inside processor 610. In one embodiment, system 600 includes multiple processors including 610 and 605, where processor 605 has logic similar or identical to the logic of processor 610. In some embodiments, processing core 612 includes, but is not limited to, pre-fetch logic to fetch instructions, decode logic to decode the instructions, execution logic to execute instructions and the like. In some embodiments, processor 610 has a cache memory 616 to cache instructions and/or data for system 600. Cache memory 616 may be organized into a hierarchal structure including one or more levels of cache memory.

In some embodiments, processor 610 includes a memory controller 614, which is operable to perform functions that enable the processor 610 to access and communicate with memory 630 that includes a volatile memory 632 and/or a non-volatile memory 634. In some embodiments, processor 610 is coupled with memory 630 and chipset 620. Processor 610 may also be coupled to a wireless antenna 678 to communicate with any device configured to transmit and/or receive wireless signals. In one embodiment, the wireless antenna interface 678 operates in accordance with, but is not limited to, the IEEE 802.11 standard and its related family, Home Plug AV (HPAV), Ultra-Wide Band (UWB), Bluetooth, WiMax, or any form of wireless communication protocol.

In some embodiments, volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory, phase change memory (PCM), read-only memory (ROM), electrically erasable programmable read-only memory (EEPROM), or any other type of non-volatile memory device.

Memory 630 stores information and instructions to be executed by processor 610. In one embodiment, memory 630 may also store temporary variables or other intermediate information while processor 610 is executing instructions. In the illustrated embodiment, chipset 620 connects with processor 610 via Point-to-Point (PtP or P-P) interfaces 617 and 622. The interfaces 617 and 622 may include one or more optical interfaces. Chipset 620 enables processor 610 to connect to other elements in system 600. In some embodiments of the invention, interfaces 617 and 622 operate in accordance with a PtP communication protocol such as the Intel® QuickPath Interconnect (QPI) or the like. In other embodiments, a different interconnect may be used.

In some embodiments, chipset 620 is operable to communicate with processor 610, 605N, display device 640, and other devices 672, 676, 674, 660, 662, 664, 666, 677, etc. Buses 650 and 655 may be interconnected together via a bus bridge 672. Chipset 620 connects to one or more buses 650 and 655 that interconnect various elements 674, 660, 662, 664, and 666. Chipset 620 may also be coupled to a wireless antenna 678 to communicate with any device configured to transmit and/or receive wireless signals. Chipset 620 connects to display device 640 via interface (I/F) 626. Display 640 may be, for example, a liquid crystal display (LCD), a plasma display, cathode ray tube (CRT) display, or any other form of visual display device. In some embodiments of the invention, processor 610 and chipset 620 are merged into a single SOC. In one embodiment, chipset 620 couples with (e.g., via interface 624) a non-volatile memory 660, a mass storage medium 662, a keyboard/mouse 664, and a network interface 666 via I/F 624 and/or I/F 626, I/O devices 674, smart TV 676, consumer electronics 677 (e.g., PDA, Smart Phone, Tablet, etc.). One or more of interfaces 624 and 626 may be an optical interface.

In one embodiment, mass storage medium 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra-Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although cache memory 616 is depicted as a separate block within processor 610, cache memory 616 (or selected aspects of 616) can be incorporated into processor core 612.

The devices, systems, and methods described can provide improved routing of interconnection between ICs for a multichip package in addition to providing improved transistor density in the IC die. Examples described herein include two or three IC dies for simplicity, but one skilled in the art would recognize upon reading this description that the examples can include more than three IC dice.

ADDITIONAL DESCRIPTION AND EXAMPLES

Example 1 includes subject matter (such as an electronic device) comprising a photonic integrated circuit (PIC) including at least one waveguide, an emitting lens disposed on the PIC to emit light from the at least one waveguide in a direction substantially parallel to a first surface of the PIC, and an optical element disposed on the PIC and having a reflective surface configured to expand light emitted from the emitting lens and direct the expanded light in a direction away from the first surface of the PIC.

In Example 2, the subject matter of Example 1 optionally includes an optical element having a reflective surface that includes a total internal reflection surface.

In Example 3, the subject matter of one or both of Examples 1 and 2 optionally includes an optical element having a flat reflective surface configured to direct the expanded light in a direction substantially orthogonal to the first surface of the PIC.

In Example 4, the subject matter of one or any combination of Examples 1-3 optionally includes a buried insulator layer positioned at a height intermediate to the first surface of the PIC and a bottom surface opposite the first surface of the PIC, and the emitting lens is arranged between the first surface and the buried insulator layer.

In Example 5, the subject matter of one or any combination of Examples 1-4 optionally includes the first surface of PIC including bonding pads.

In Example 6, the subject matter of Example 5 optionally includes solder bumps on the bonding pads and a height of the solder bumps is greater than a height of the optical element from the first surface.

In Example 7, the subject matter of one or any combination of Examples 1-6 optionally includes multiple emitting lenses, multiple optical elements, a PIC that includes multiple optical signal media to each provide an optical signal to a respective emitting lens of the multiple emitting lenses. The reflective surface of a respective optical element is configured to steer light received from the corresponding emitting lens in a direction substantially orthogonal to the first surface of the PIC.

Example 8 includes subject matter (such as a method of forming an electronic device) or can optionally be combined with one or any combination of Examples 1-7 to include such subject matter, comprising forming a photonic integrated circuit (PIC) that includes at least one waveguide, arranging an emitting lens on the PIC, the emitting lens positioned to emit light from the waveguide in a direction substantially parallel to a first surface of the PIC, and attaching an optical element on the PIC, the optical element configured to expand light received from the emitting lens and including a total internal reflection surface configured to steer the expanded light received from the emitting lens in a direction away from the first surface of the PIC.

In Example 9, the subject matter of Example 8 optionally includes forming a buried insulator layer in the PIC and arranging the emitting lens on the buried insulator layer of the PIC.

In Example 10, the subject matter of one or both of Examples 8 and 9 optionally includes etching to form the emitting lens on the PIC.

In Example 11, the subject matter of one or any combination of Examples 8-10 optionally includes disposing solder bumps on bonding pads on the first surface of the PIC and attaching the first surface of the PIC to a glass substrate using the solder bumps. The glass substrate including a waveguide.

In Example 12, the subject matter of one or any combination of Examples 8-11 optionally includes underfilling the PIC using an underfill material transparent to light in an infrared spectrum.

In Example 13, the subject matter of one or any combination of Examples 8-12 optionally includes attaching the first surface of the PIC to a glass substrate that includes a waveguide. The glass substrate includes a curved mirror configured to focus the light received from the optical element onto the waveguide.

In Example 14, the subject matter of one or any combination of Examples 8-12 optionally includes attaching the first surface of the PIC to a glass substrate that includes a waveguide. The glass substrate includes a mirror configured to steer the light received from the optical element onto the waveguide, and a lens configured to focus the light received from the optical element onto the mirror.

In Example 15, the subject matter of one or any combination of Examples 8-14 optionally includes forming a PIC that includes multiple optical signal sources, arranging an emitting lens on the PIC for each of multiple optical signal sources of the PIC, attaching an optical element on the PIC for each of the optical signal sources, and attaching the first surface of the PIC to a glass substrate having a waveguide for each of the multiple optical signal sources.

Example 16 includes subject matter (such as an optical signal interface) or can optionally be combined with one or any combination of Examples 1-15 to include such subject matter, comprising a PIC mounted on a glass substrate. The PIC includes at least one optical signal source, at least one emitting lens positioned to emit light from the at least one optical signal source in a direction substantially parallel to a first surface of the PIC, and at least one optical element having a reflective surface configured to steer light emitted from the at least one emitting lens in a direction substantially orthogonal to the first surface of the PIC and wherein the first surface of the PIC is attached to the top surface of the glass substrate. The glass substrate includes a second optical element configured to receive light from the PIC orthogonal to a top surface of the glass substrate and steer the received light on at least one waveguide that extends within the glass substrate in a direction parallel to the top surface of the glass substrate.

In Example 17, the subject matter of Example 16 optionally includes the second optical element being a curved mirror configured to steer the light received from the PIC onto the waveguide.

In Example 18, the subject matter of Example 16 optionally includes the second optical element including a lens on the glass substrate to reduce light received from the first optical element and a mirror configured to steer the light onto the waveguide.

In Example 19, the subject matter of one or any combination of Examples 16-18 optionally includes solder bumps bonding the first surface of the PIC to the top surface of the glass substrate.

In Example 20 the subject matter of one or any combination of Examples 16-19 optionally includes an underfill material between the first surface of the PIC and the top surface of the glass substrate, wherein the underfill material is transparent to light in an infrared spectrum.

In Example 21, the subject matter of one or any combination of Examples 16-20 optionally includes multiple optical signal sources, an emitting lens for each optical signal source, and an optical element for each optical signal source configured to steer light emitted from a corresponding emitting lenses in a direction substantially orthogonal to the first surface of the PIC to the top surface of the glass substrate. The glass substrate includes a waveguide for each optical signal source.

These non-limiting examples can be combined in any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An electronic device comprising:
   a photonic integrated circuit (PIC) including at least one waveguide;
   an emitting lens disposed on the PIC to emit light from the at least one waveguide in a direction substantially parallel to a first surface of the PIC;
   an optical element disposed on the PIC and having a reflective surface configured to expand light emitted from the emitting lens and direct expanded light in a direction away from the first surface of the PIC; and
   a glass substrate comprising a waveguide wherein the PIC is disposed on the glass substrate and wherein expanded light emitted from the emitting lens is directed toward the glass substrate.

2. The electronic device of claim 1, wherein the reflective surface of the optical element includes a total internal reflection surface.

3. The electronic device of claim 1, wherein the reflective surface is a flat reflective surface configured to direct the expanded light in a direction substantially orthogonal to the first surface of the PIC.

4. The electronic device of claim 1, including:
a buried insulator layer positioned at a height intermediate to the first surface of the PIC and a bottom surface opposite the first surface of the PIC; and
wherein the emitting lens is arranged between the first surface and the buried insulator layer.

5. The electronic device of claim 1, wherein the first surface includes bonding pads.

6. The electronic device of claim 5, including solder bumps on the bonding pads and a height of the solder bumps is greater than a height of the optical element from the first surface.

7. The electronic device of claim 1, including:
multiple emitting lenses;
multiple optical elements;
wherein the PIC includes multiple optical signal media to each provide an optical signal to a respective emitting lens of the multiple emitting lenses; and
wherein the reflective surface of a respective optical element is configured to steer light received from the respective emitting lens in a direction substantially orthogonal to the first surface of the PIC.

8. A method of forming an electronic device, the method comprising:
forming a photonic integrated circuit (PIC) that includes at least one waveguide;
arranging an emitting lens on the PIC, the emitting lens positioned to emit light from the at least one waveguide in a direction substantially parallel to a first surface of the PIC;
attaching an optical element on the PIC, the optical element configured to expand light received from the emitting lens and including a total internal reflection surface configured to steer expanded light received from the emitting lens in a direction away from the first surface of the PIC; and
attaching the first surface of the PIC to a glass substrate having a waveguide.

9. The method of claim 8,
wherein the forming a PIC includes forming a buried insulator layer in the PIC; and
wherein the arranging the emitting lens includes arranging the emitting lens on the buried insulator layer of the PIC.

10. The method of claim 8, wherein arranging the emitting lens includes etching to form the emitting lens on the PIC.

11. The method of claim 8, including:
disposing solder bumps on bonding pads on the first surface of the PIC; and
attaching the first surface of the PIC to a glass substrate using the solder bumps, wherein the glass substrate includes a waveguide.

12. The method of claim 11, including underfilling the PIC using an underfill material transparent to light in an infrared spectrum.

13. The method of claim 8, wherein the glass substrate also includes a curved mirror configured to focus the light received from the optical element onto the waveguide.

14. The method of claim 8, wherein the glass substrate also includes:
a mirror configured to steer the light received from the optical element onto the waveguide; and
a lens configured to focus the light received from the optical element onto the mirror.

15. The method of claim 8,
wherein forming a PIC that includes at least one waveguide includes forming a PIC that includes multiple optical signal sources;
wherein arranging an emitting lens on the PIC includes arranging an emitting lens on the PIC for each of the multiple optical signal sources of the PIC;
wherein attaching an optical element on the PIC includes attaching an optical element on the PIC for each of the multiple optical signal sources; and
wherein the glass substrate has a waveguide for each of the multiple optical signal sources.

16. An optical signal interface comprising:
a photonic integrated circuit (PIC) mounted on a glass substrate;
wherein the PIC includes:
at least one optical signal source;
at least one emitting lens positioned to emit light from the at least one optical signal source in a direction substantially parallel to a first surface of the PIC; and
at least one first optical element having a reflective surface configured to steer light emitted from the at least one emitting lens in a direction substantially orthogonal to the first surface of the PIC and wherein the first surface of the PIC is attached to a surface of the glass substrate; and
wherein the glass substrate includes:
a second optical element configured to receive light from the PIC orthogonal to the surface of the glass substrate and steer the received light onto at least one waveguide that extends within the glass substrate in a direction parallel to the surface of the glass substrate.

17. The optical signal interface of claim 16, wherein the second optical element is a curved mirror configured to steer the light received from the PIC onto the at least one waveguide.

18. The optical signal interface of claim 16, wherein the second optical element includes a lens on the glass substrate to reduce light received from the at least one first optical element and a mirror configured to steer the light onto the at least one waveguide.

19. The optical signal interface of claim 16, including solder bumps bonding the first surface of the PIC to the surface of the glass substrate.

20. The optical signal interface of claim 16, including an underfill material between the first surface of the PIC and the surface of the glass substrate, wherein the underfill material is transparent to light in an infrared spectrum.

21. The optical signal interface of claim 16,
wherein the at least one optical signal source includes multiple optical signal sources;
wherein the at least one emitting lens includes an emitting lens for each optical signal source;
wherein the at least one optical element includes an optical element for each optical signal source configured to steer light emitted from a corresponding emitting lens in a direction substantially orthogonal to the first surface of the PIC to a top surface of the glass substrate; and
wherein the glass substrate includes a waveguide for each optical signal source.

* * * * *